United States Patent
Kuo

(10) Patent No.: US 11,892,306 B2
(45) Date of Patent: Feb. 6, 2024

(54) METHOD, SERVER, NON-TRANSITORY COMPUTER-READABLE STORAGE MEDIUM AND APPLICATION SPECIFIC INTEGRATED CIRCUIT FOR IDENTIFYING DANGEROUS ROAD SECTIONS

(71) Applicant: MiTAC Digital Technology Corporation, Taoyuan (TW)

(72) Inventor: Shen-Liang Kuo, Taoyuan (TW)

(73) Assignee: MiTAC Digital Technology Corporation, Taoyuan (TW)

( * ) Notice: Subject to any disclaimer, the term of this patent is extended or adjusted under 35 U.S.C. 154(b) by 86 days.

(21) Appl. No.: 17/123,309

(22) Filed: Dec. 16, 2020

(65) Prior Publication Data

US 2021/0180966 A1 Jun. 17, 2021

(30) Foreign Application Priority Data

Dec. 17, 2019 (TW) ................. 108146194

(51) Int. Cl.
*G06F 16/29* (2019.01)
*G01C 21/32* (2006.01)
(Continued)

(52) U.S. Cl.
CPC ......... *G01C 21/3461* (2013.01); *G01C 21/32* (2013.01); *G06F 16/29* (2019.01); *G08G 1/0104* (2013.01)

(58) Field of Classification Search
CPC ..... G01C 21/3461; G01C 21/32; G06F 16/29; G08G 1/0104
See application file for complete search history.

(56) References Cited

U.S. PATENT DOCUMENTS 9,430,944 B2 8/2016 Grimm et al.
9,688,286 B2 6/2017 Wilkes, III et al.
(Continued)

FOREIGN PATENT DOCUMENTS

CN 105788311 A 7/2016
FR 2997216 A1 4/2014
(Continued)

OTHER PUBLICATIONS

Search Report appended to an Office Action, which was issued to Taiwanese counterpart application No. 108146194 by the TIPO dated Jan. 22, 2021, with an English translation thereof.

*Primary Examiner* — Anne Marie Antonucci
*Assistant Examiner* — Jared C Bean
(74) *Attorney, Agent, or Firm* — Hammer & Associates, P.C.

(57) ABSTRACT

A method for identifying dangerous roads includes: receiving a vehicle dataset and extracting a driving record associated with a travelled road section therefrom; for a road section belonging to one of a plurality of section categories, obtaining a driving record from the vehicle dataset; calculating a driving characteristic dataset based on the driving records that are associated with an identified road section; and determining, whether the identified road section should be deemed as a potential dangerous road section based on at least the driving characteristic dataset and a corresponding one of a plurality of reference datasets that corresponds to one of the plurality of section categories.

10 Claims, 8 Drawing Sheets

(51) Int. Cl.
    *G01C 21/34*     (2006.01)
    *G08G 1/01*     (2006.01)

(56)     References Cited

U.S. PATENT DOCUMENTS

| | | | |
|---|---|---|---|
| 9,862,315 B2 | 1/2018 | Hoye | |
| 10,830,605 B1* | 11/2020 | Chintakindi | G01C 21/3484 |
| 2011/0046877 A1* | 2/2011 | Hoffmann | G01C 21/3492 |
| | | | 701/467 |
| 2014/0195068 A1* | 7/2014 | Boss | G08G 1/096775 |
| | | | 701/1 |
| 2015/0344038 A1* | 12/2015 | Stenneth | G07C 5/008 |
| | | | 340/439 |
| 2016/0061625 A1* | 3/2016 | Wang | G01C 21/3697 |
| | | | 701/454 |
| 2016/0086285 A1* | 3/2016 | Jordan Peters | G08G 1/096827 |
| | | | 701/484 |
| 2016/0133130 A1* | 5/2016 | Grimm | G08G 1/0129 |
| | | | 340/905 |

FOREIGN PATENT DOCUMENTS

| | | | |
|---|---|---|---|
| KR | 101542715 B1 | 8/2015 | |
| TW | 201237816 A | 9/2012 | |
| TW | 201719541 A | 6/2017 | |
| TW | 201800289 A | 1/2018 | |
| WO | WO-2016135561 A1 * | 9/2016 | |

\* cited by examiner

METHOD, SERVER, NON-TRANSITORY COMPUTER-READABLE STORAGE MEDIUM AND APPLICATION SPECIFIC INTEGRATED CIRCUIT FOR IDENTIFYING DANGEROUS ROAD SECTIONS

CROSS-REFERENCE TO RELATED APPLICATION

This application claims priority of Taiwanese Patent Application No. 108146194, filed on Dec. 17, 2019.

FIELD

The disclosure relates to a method and a system for identifying dangerous road sections.

BACKGROUND

Typically, some specific road sections may be more dangerous than others. For road users (e.g., a driver of a vehicle) who is not familiar with the environment of an dangerous road section, it may be beneficial to know that this road section is dangerous when driving thereon.

Additionally, in determining the cause of a traffic accident, it is beneficial to incorporate, as a factor, the characteristic of the road section where the traffic accident took place.

SUMMARY

One object of the disclosure is to provide a method for identifying dangerous road sections.

According to one embodiment of the disclosure, the method is implemented using a server that communicates with a plurality of vehicles. The server includes a processor, a communication unit, and a data storage that stores an electronic map and a plurality of section categories each of which is defined by at least one condition of a road section, and a plurality of reference datasets that correspond respectively with the plurality of section categories. Each of the reference datasets represents a representative driving pattern of vehicles driving on predetermined dangerous road sections that belong to the respective one of the plurality of section categories. The method includes steps of:

by the processor, obtaining an identified road section by scanning the electronic map to identify an unidentified road section that fits the at least one condition associated with one of the plurality of the section categories to serve as the identified road section, and categorizing the identified road section into said one of the plurality of the section categories;

receiving, by the communication unit, a vehicle dataset from each of the vehicles, the vehicle dataset including a moving track of the vehicle and raw data related to a plurality of components of the vehicle;

with respect to the vehicle dataset from each of the vehicles, determining, by the processor, whether the moving track included in the vehicle dataset indicates that a travelled road section, through which the vehicle has travelled, has been categorized into one of the plurality of section categories, and when it is determined that the travelled road section has been categorized into one of the plurality of section categories, by the processor, extracting a driving record associated with the travelled road section from the vehicle dataset and storing the driving record in the data storage, so as to obtain, for each of the road sections belonging to one of the plurality of section categories, a plurality of driving records that are obtained respectively from the vehicle datasets of the vehicles which were driven on the road section;

for each of the identified road sections, calculating, by the processor, an identified-road-section (IRS) driving characteristic dataset based on the driving records that are associated with the identified road section; and for each of the identified road sections, determining, by the processor, whether the identified road section should be deemed as a potential dangerous road section based on at least the IRS driving characteristic dataset and a corresponding one of the plurality of reference datasets that corresponds to one of the section categories, to which the identified road section belongs.

Another object of the disclosure is to provide a server that is capable of implementing the above-mentioned method.

According to one embodiment of the disclosure, the server includes a processor, a communication unit coupled to the processor for communicating with a plurality of vehicles, and a data storage.

The data storage is coupled to the processor and stores an electronic map and a plurality of section categories. Each of the section categories is defined by at least one condition of a road section. The data storage further stores a plurality of reference datasets that correspond respectively the plurality of section categories. Each of the reference datasets represents a representative driving pattern of vehicles driving on predetermined dangerous road sections that belong to the respective one of the plurality of section categories. The processor is programmed to:

obtain an identified road section by scanning the electronic map to identify an unidentified road section that fits the at least one condition associated with one of the plurality of the section categories to serve as the identified road section, and categorize the identified road section into the one of the plurality of the section categories;

control the communication unit to receive a vehicle dataset from each of the vehicles, the vehicle dataset including a moving track of the vehicle and raw data related to a plurality of components of the vehicle;

with respect to the vehicle dataset from each of the vehicles, determine whether the moving track included in the vehicle dataset indicates that a travelled road section, through which the vehicle has travelled, has been categorized into one of the plurality of section categories, and when it is determined that the travelled road section has been categorized into one of the plurality of section categories, extract a driving record associated with the travelled road section from the vehicle dataset and store the driving record in the data storage, so as to obtain, for each of the road sections belonging to one of the plurality of section categories, a plurality of driving records that are obtained respectively from the vehicle datasets of the vehicles which were driven on the road section;

for each of the identified road sections, calculate an identified-road-section (IRS) driving characteristic dataset based on the driving records that are associated with the identified road section; and for each of the identified road sections, determine whether the identified road section should be deemed as a potential dangerous road section based on at least the IRS driving characteristic dataset and a corresponding one of the reference datasets that corresponds to one of the section categories, to which the identified road section belongs.

Another object of the disclosure is to provide a non-transitory computer-readable storage medium storing instructions that, when executed by a processor of an electronic device communicating with a plurality of vehicles, cause the processor to perform steps of the above-mentioned method.

Another object of the disclosure is to provide an application specific integrated circuit (ASIC) that includes circuit blocks that, when integrated with an electronic device communicating with a plurality of vehicles, cause the electronic device to perform steps of above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
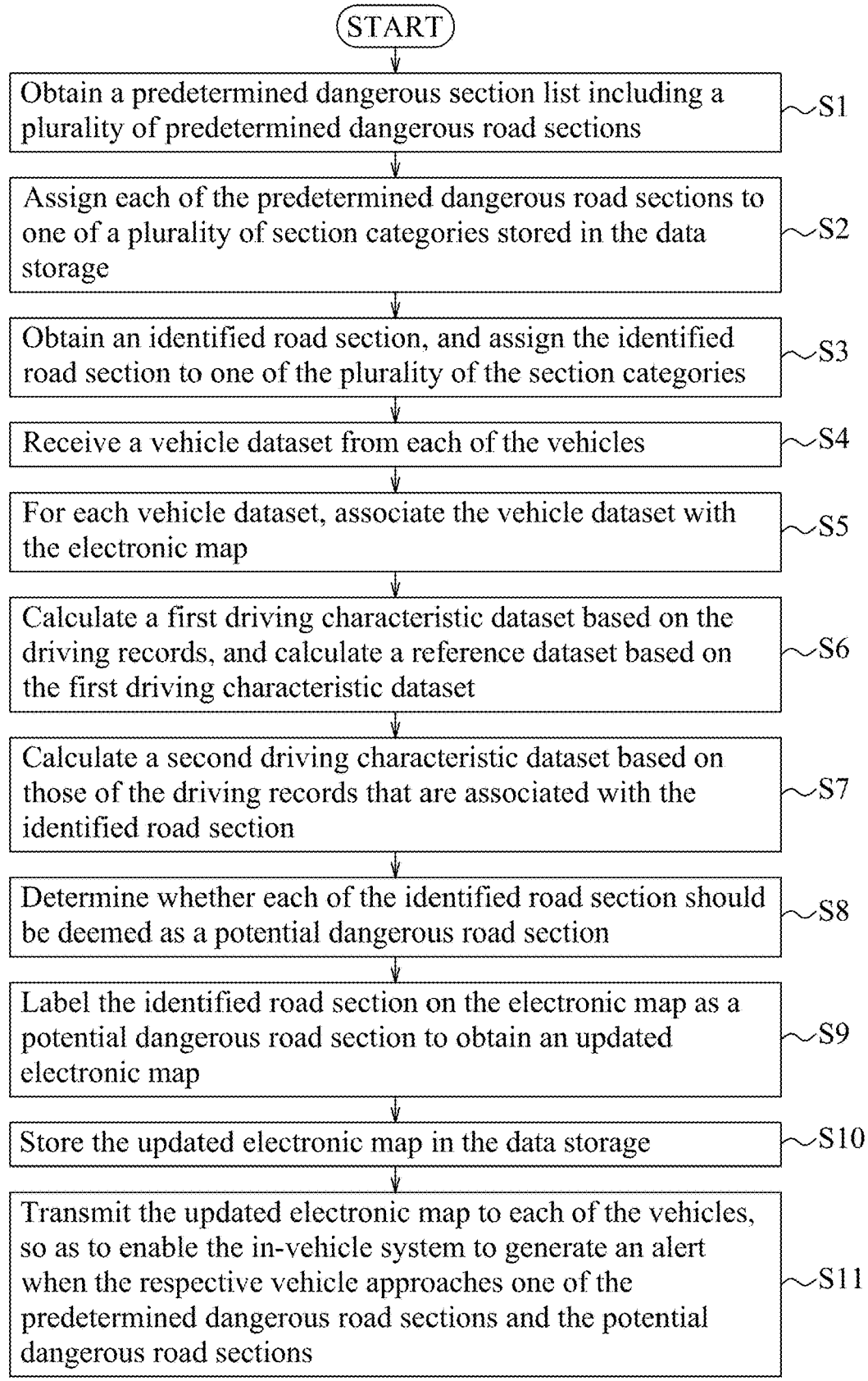
FIG. 1 is a flow chart illustrating steps of a method for identifying dangerous road sections according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "connected to" may refer to a direct connection among a plurality of electrical apparatus/devices/equipments via an electrically conductive material (e.g., an electrical wire), or an indirect connection between two electrical apparatus/devices/equipments via another one or more apparatus/device/equipment, or wireless communication.

FIG. 1 is a flow chart illustrating steps of a method for identifying dangerous road sections according to one embodiment of the disclosure.

In this embodiment, the method of FIG. 1 may be implemented using a system that includes a central server, and a plurality of in-vehicle computers associated with a plurality of vehicles, respectively.

Figure 2:
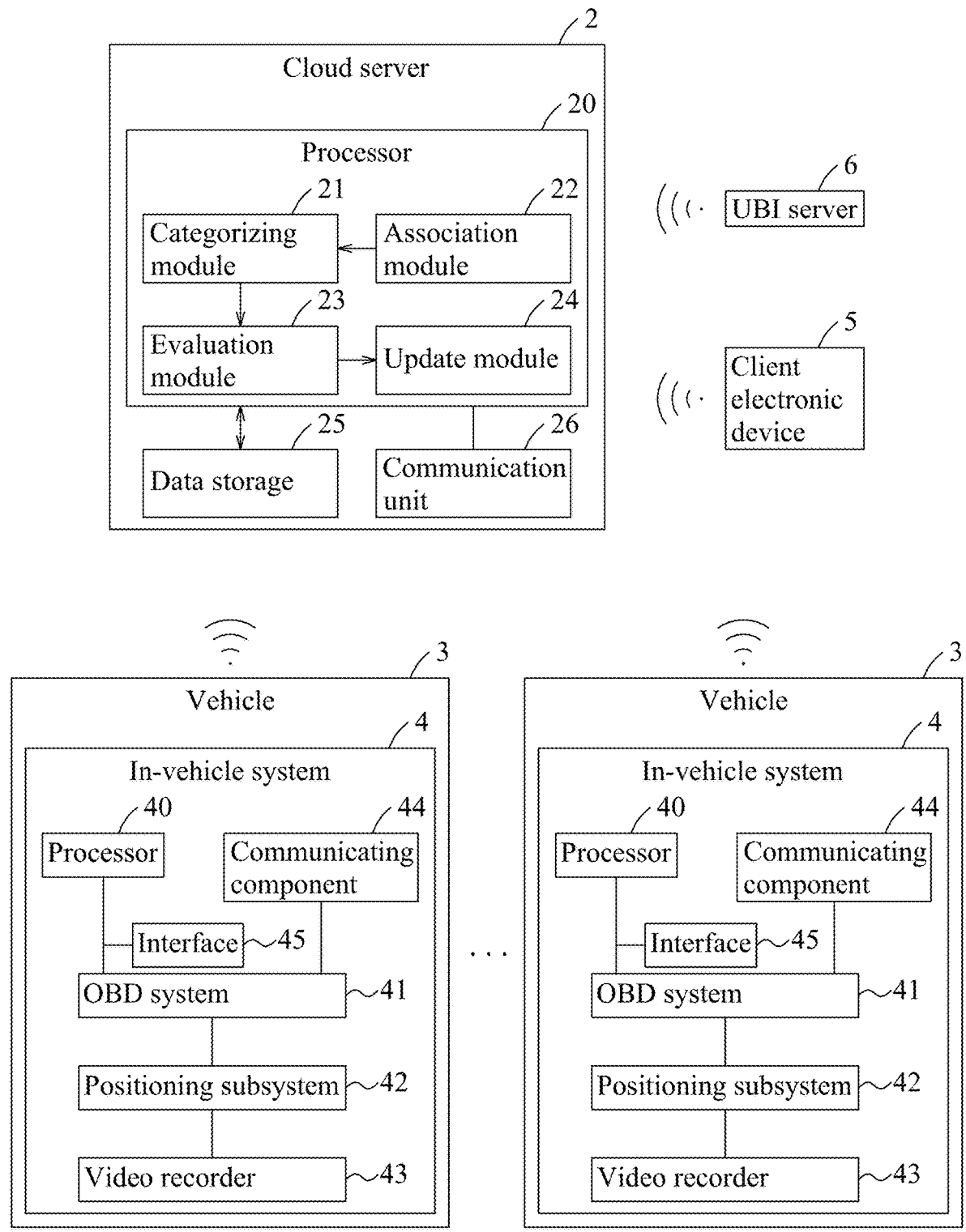
FIG. 2 is a block diagram illustrating a system for implementing the method according to one embodiment of the disclosure.

FIG. 2 is a block diagram illustrating a system for implementing the method of FIG. 1 according to one embodiment of the disclosure.

In this embodiment, the system includes a server 2, a plurality of in-vehicle electronic systems 4 respectively associated with a plurality of vehicles 3, one or more client electronic devices 5, and a usage-based insurance (UBI) server 6.

The server 2 may be embodied using a cloud server or other server device with computing capabilities, and includes a processor 20, a data storage 25 and a communication unit 26.

The processor 20 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage 25 may be embodied using one or more of a hard disk, a solid-state drive (SSD) and other non-transitory storage medium.

The communication unit 26 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

In some embodiments, the processor 20 includes a plurality of modules that are embodied in the form of application specific integrated circuit (ASIC) chips or programmable logic devices (PLD), and are configured to perform the steps of the method. In other embodiments, the modules are in the form of software programs stored in the data storage 25 and includes instructions that, when executed by the processor 20, cause the processor 20 to perform the steps of the method. In some embodiments, the modules are in the form of firmware stored in a microcontroller of the server 2, and includes instructions that, when executed by the processor 20, cause the processor 20 to perform the steps of the method.

Each of the in-vehicle electronic systems 4 is included in the respective one of the vehicles 3 (e.g., the electronic systems 4 may each be installed in the respective vehicle 3), and includes a processor 40, an on-board diagnostic (OBD) subsystem 41, a positioning subsystem 42, a video recorder 43, a communicating component 44 and an interface 45.

The processor 40 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

In this embodiment, the OBD subsystem 41 includes a plurality of sensors (not shown) that are connected to various components of the vehicle 3, so as to generate a plurality of signals indicating raw data related to the components of the vehicle 3. For example, the sensors may be connected to a steering wheel, a brake pedal, a fuel gauge, etc., respectively, so as to detect the raw data related thereto. Additionally, the OBD subsystem 41 may include an acceleration sensor (not depicted in the drawings) for detecting acceleration data of accelerations of the vehicle 3 respectively in a plurality of directions.

The positioning subsystem 42 may include components for positioning the vehicle 3, such as a global positioning system (GPS) component. Furthermore, the positioning subsystem 42 includes a recording component that stores a moving track of the vehicle 3 using position data collected by the GPS component.

The video recorder 43 may be embodied using a driving video recorder (DVR) with a wide angle lens that is capable of covering an angle of at least 120 degrees, and may be disposed in the vehicle 3 and face outside of the vehicle 3 for recording a vehicle-captured video of surrounding environment of the vehicle 3 in at least one direction.

The communicating component 44 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The interface 45 may include a display screen for displaying information such as an electronic map, and an audio output component such as an electronic speaker.

In use, the processor 40 may periodically integrate the raw data, the acceleration data of the vehicle 3 and the moving track of the vehicle 3 into a vehicle dataset, and control the communicating component 43 to transmit the vehicle dataset to a remote device (e.g., the server 2, the UBI server 6, etc.).

Each the one or more client electronic devices 5 may be embodied using a smartphone, a laptop, a tablet, etc., and is configured to communicate with the server 2 over a network (e.g., the Internet).

Referring to FIG. 1, in step S1 of the method, the processor 20 obtains a predetermined dangerous section list including a plurality of predetermined dangerous road sections.

Specifically, the predetermined dangerous section list may be published by a public institution (e.g., a local police department, an official transportation department such as Ministry of Transportation and Communication (MOTC) of Taiwan, etc.). For each of the predetermined dangerous road sections, a set of numbers may be attached to indicate different kinds of traffic accidents that occurred in the road section over a time period (e.g., a month, a year, etc.). In some examples, the processor 20 obtains a plurality of predetermined dangerous section lists from a plurality of local police departments, respectively. For example, each of the local police departments may release a list including a number of road sections (e.g., 10) with the most occurrences of accidents, and the list from each of the local police departments may be obtained by the processor 20 to serve as a part of the predetermined dangerous section list. Using the predetermined dangerous section list, the processor 20 may be configure to determine whether a specific road section may be dangerous as well. It is noted that in some cases, the predetermined dangerous section lists may be expanded by individual users submitting a report to the server 2. For example, when a user had a vehicular accident on a specific road section, he/she may submit the report that includes the name of the specific road section. In response, the server 2 may determine whether the specific road section should be included in the predetermined dangerous section lists.

In response to receipt of the predetermined dangerous section list, the processor 20 may assign each of the predetermined dangerous road sections to one of a plurality of section categories stored in the data storage 25 in step S2. The operations in this step may be done by a categorizing module 21 of the processor 20. In this embodiment, the categorizing module 21 may be embodied using a software application or a deep learning neural network to perform the operations of categorizing the predetermined dangerous road sections.

Specifically, each of the plurality of section categories is associated with a type of road section, and is defined by at least one condition. For example, each of the section categories may be defined by one of the conditions including: a road section with one curve; a road section with multiple curves; an intersection with more than three arms; a road section with multiple lanes converging (or merging) into a reduced number of lanes; and a straight road section with a length greater than a predetermined distance (such as three kilometers, on which a driver of the vehicle 3 may be prone to drive the vehicle 3 to move faster than the speed limit). It is noted that in other embodiments, other possible condition(s) may also be incorporated into the section categories, and is not limited to the conditions as listed above.

In some cases, a special section category may be defined as including more than one condition (e.g., a road section with multiple curves followed by an intersection with more than three arms) and therefore is presumed dangerous.

Figure 3:
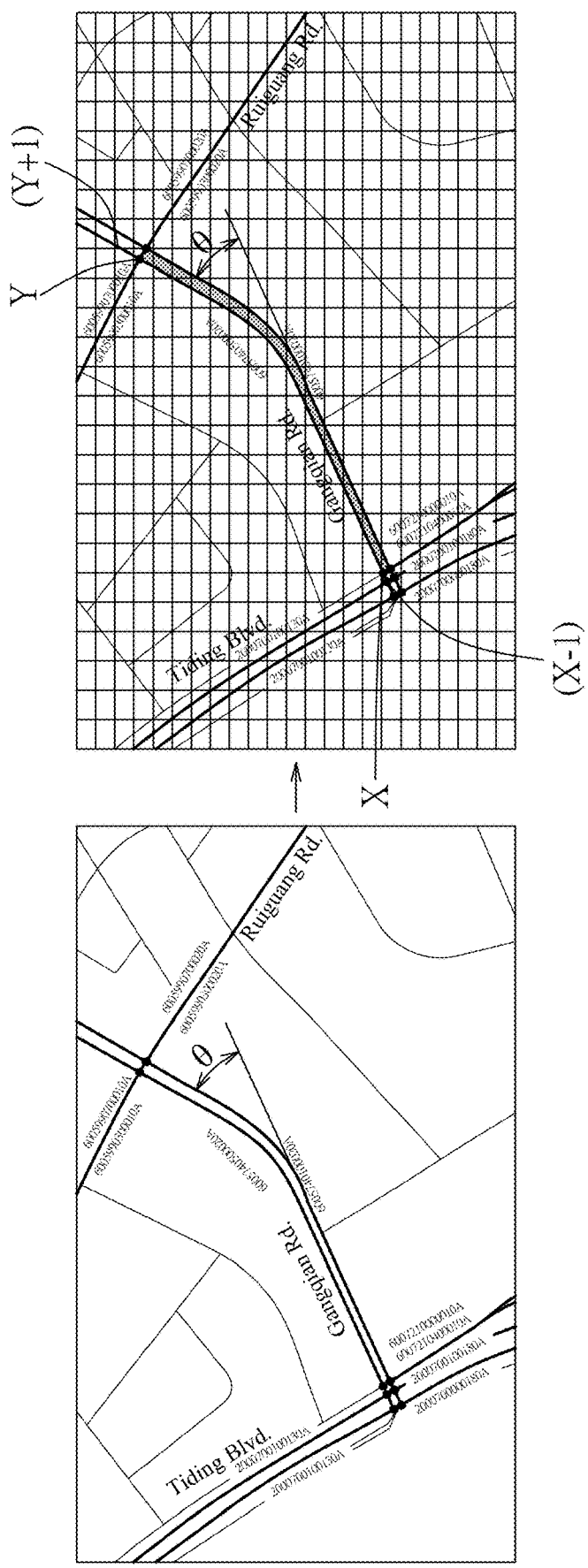
FIG. 3 exemplarily illustrates identification of a road section on an electronic map.

In some examples, the curve of a road section between two straight segments of the road section may be further defined using a curve angle $\theta$ included by the straight segments (see a left part of FIG. 3 showing a part of the electronic map). For example, when a road section has a curve with a curve angle $\theta$ smaller than 30 degrees, the categorizing module 21 may assign the road section to one distinct category; when a road section has a curve with a curve angle $\theta$ between 30 to 60 degrees, the categorizing module 21 may assign the road section to another distinct category; when a road section has a curve with a curve angle $\theta$ greater than 60 degrees, the categorizing module 21 may assign the road section to yet another distinct category.

For each of the predetermined dangerous road sections included in the predetermined dangerous section list, the categorizing module 21 may determine a shape of the road section on the electronic map by first determining a plurality of successive coordinate points (using for example the geographic coordinate system) that cooperatively constitute the road section on the electronic map.

In the example of FIG. 3, when a road section of "Gangqian Road" is included in the predetermined dangerous section list, the categorizing module 21 may identify the road section of Gangqian Road on the electronic map, and determine the coordinate points constituting the road section of Gangqian Road on the electronic map.

Afterward, the categorizing module 21 determines a start point (i.e., the point (X)) and an endpoint (i.e., the point (Y)) of the road section (see a right part of FIG. 3 showing a part of the electronic map being processed, with every rectangular block representing a specific coordinate set in geographic coordinate system), and determines which one of the plurality of section categories the road section should belong to. It is noted that when a specific road section cannot be categorized into anyone of the section categories, the road section may be considered not accident prone, and be left out of further processing.

In step S3, the processor 20 scans the electronic map to obtain an identified road section by identifying an unidentified road section that fits the at least one condition associated with any one of the plurality of section categories to serve as the identified road section, and assigns the identified road section to said one of the plurality of section categories. That is to say, the categorizing module 21 scans parts of the electronic map containing road sections that are not included in the predetermined dangerous section list, and assigns each road section thus identified into a corresponding one of the plurality of the section categories. Accordingly, a plurality of identified road sections each fitting the at least one condition associated with one of the plurality of the section categories can be obtained and be each assigned into a corresponding one of the plurality of the section categories.

Figure 4:
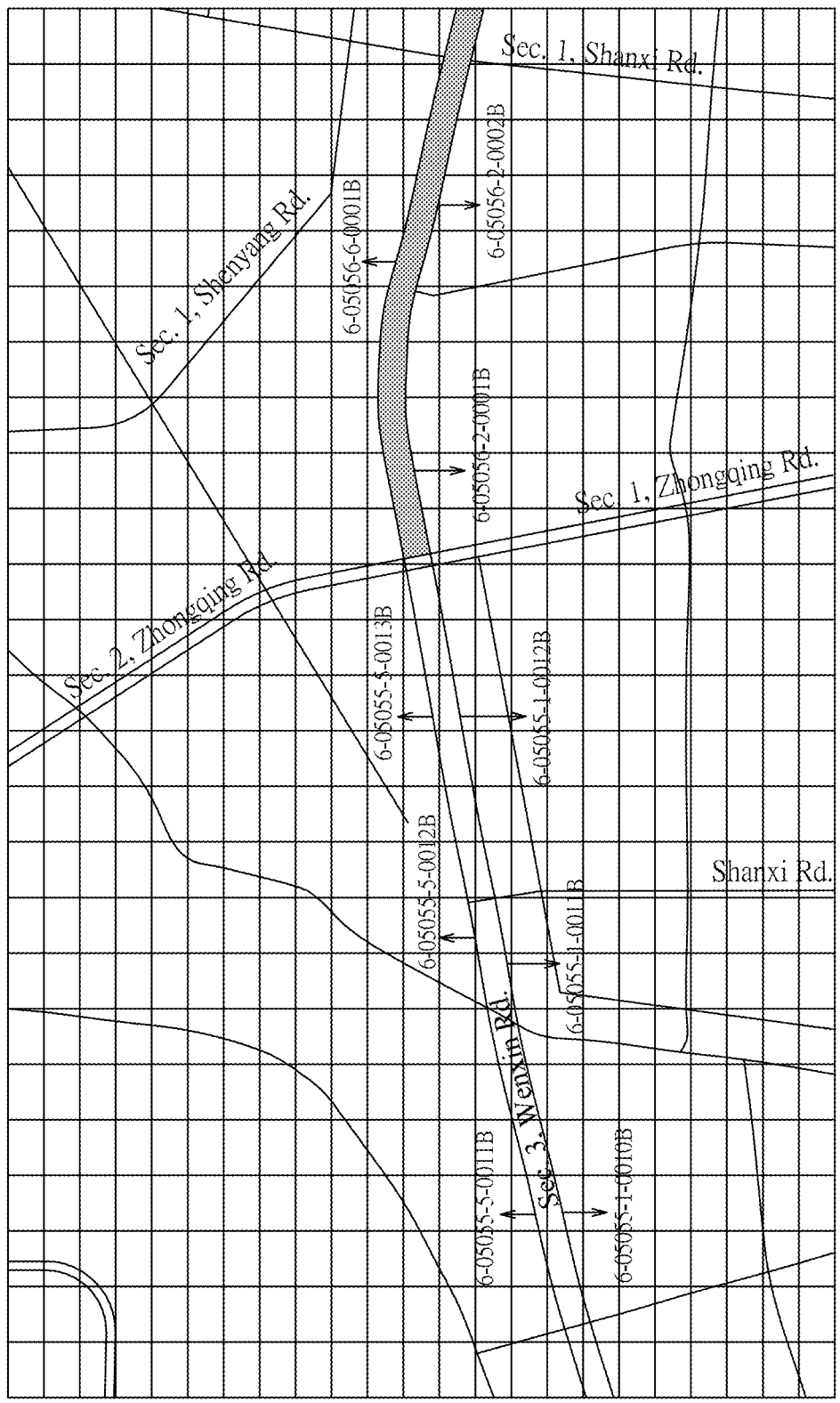
FIG. 4 is an exemplary part of the electronic map with a road section identified.

In the example of FIG. 4 showing a road section "Sec. 4, Wenxin Road" which is not included in the predetermined dangerous section list, the categorizing module 21 may identify Sec. 4 of Wenxin Road on a part of the electronic map, determine the coordinate points constituting Sec. 4 of Wenxin Road (as indicated by the bold line in FIG. 4), and then determine which one of the plurality of section categories Sec. 4 of Wenxin Road should belong to.

After the operations of steps S2 and S3, an electronic map that includes the road sections identified (each in the form of a plurality of coordinate points) (for example, in the form depicted in FIG. 4), and a road section table that contains data associated with the road sections identified and categorized may be created.

It is noted that, the operations of steps S2 and S3 may be implemented by other electronic device (s), and a resulting electronic map and the road section table may be obtained by the system from said other electronic device(s) and stored in the data storage 25. In step S4, the communication unit 26 receives a vehicle dataset from each of the vehicles 3. As described above, the vehicle dataset includes the moving track of the vehicle 3, the acceleration of the vehicle 3, and raw data recorded from components of the vehicle 3.

In step S5, for each vehicle dataset received in step S4, the processor 20 associates the vehicle dataset with the electronic map and the road section table. The operations in this step may be done by an association module 22 of the processor 20. In this embodiment, the association module 22 may be embodied using a software application or a deep learning neural network to perform the operations.

Specifically, in this step, the association module 22 is configured to, for each vehicle dataset received in step S4, determine, from the moving track included in the vehicle dataset, whether a travelled road section, through which the vehicle 3 corresponding to the vehicle dataset has travelled, has been categorized into one of the plurality of section categories.

When it is determined that the travelled road section has been categorized into one of the plurality of section categories, the association module 22 extracts a driving record associated with the travelled road section from the vehicle dataset, and stores the driving record in the data storage 25. Accordingly, for each of the road sections belonging to any one of the plurality of section categories, the data storage 25 may store a plurality of driving records that are obtained respectively from the vehicle datasets of those of the vehicles 3 that have travelled on the road section.

Figure 5:
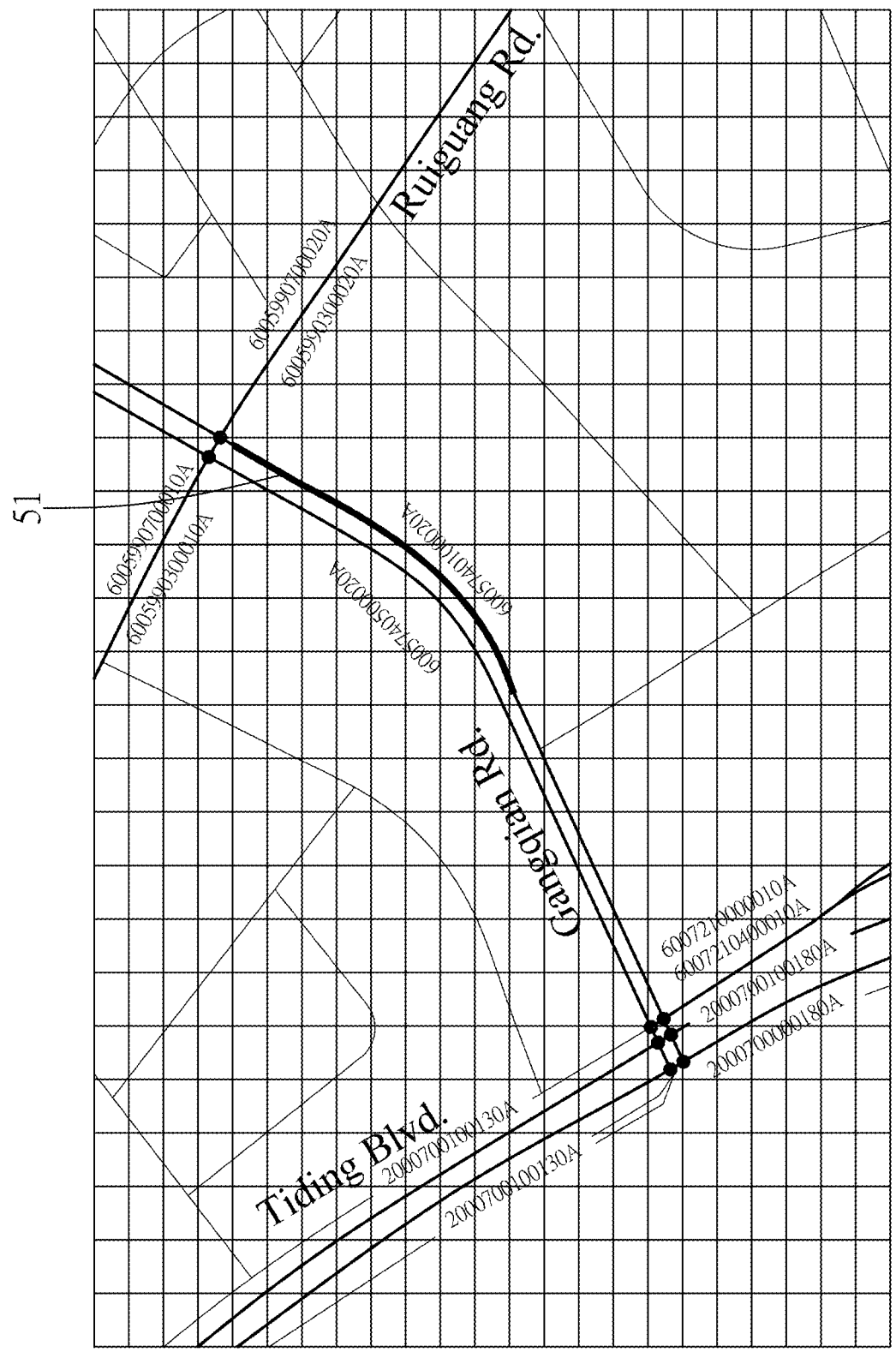
FIG. 5 is an exemplary part of the electronic map, showing a moving track of a vehicle overlapping a predetermined dangerous road section.

In the example of FIG. 5, one moving track 51 (shown in the broken line) of one vehicle 3 (see FIG. 2) may indicate that the vehicle 3 has travelled along Gangqian Road (since the coordinate points of the moving track 51 are found to overlap the points constituting Gangqian Road). Subsequently, the association module 22 extracts the driving record associated with the travelled road section (i.e., Gangqian Road) from the vehicle dataset, and stores the driving record in the data storage 25.

In this embodiment, the driving record may include various raw data recorded from the components of the vehicle 3. For example, the driving record may include a plurality of velocities recorded at specific points of the travelled road section (e.g., the velocity of the vehicle 3 in a straight portion of the road section, the velocities of the vehicle 3 entering a curve and exiting the curve (in cases that a curve is present in the road section)), a rotation angle of the steering wheel, a frequency of movement of the steering wheel (for determining whether the driver exhibited erratic control), a frequency of a brake pedal being operated, a location of the vehicle 3 when the brake pedal was operated, a force applied to the brake pedal when operated, an acceleration of the vehicle 3 (in the direction of travel), a lateral acceleration of the vehicle 3, an inclination angle of the vehicle 3, an inclination acceleration of the vehicle 3, a sudden acceleration or deceleration of the vehicle 3, a number of occurrences of sudden deceleration in the travelled road section, a number of occurrences of sudden acceleration in the travelled road section, a number of occurrences of abrupt turn in the travelled road section, etc. In this embodiment, the raw data included in the driving record includes two or more of the elements mentioned above.

After extracting the driving record, the association module 22 stores the driving record in the data storage 25. In this embodiment, the driving record may be integrated with the road section table.

The following Table 1 illustrates an exemplary road section table with the associated driving records. It is noted that, in addition to the predetermined dangerous road sections (designated by "D1-1", "D2-1", etc.), the road sections listed in the road section table may further include road sections (designated by "P1-1", "P2-1", etc.) that are not in the predetermined dangerous section list and that are identified by the categorizing module 21 in step S3.

TABLE 1

|  | Road Section | Driving Records |
|---|---|---|
| Category I |  |  |
| Road section | D1-1 | R101, R102, R103 . . . |
| having a curve | D1-2 | R111, R112, R113 . . . |
| with a curve | D1-3 | R121, R122, R123 . . . |
| angle smaller | P1-1 | r101, r102, r103 . . . |
| than 30 degrees | P1-2 | r111, r112, r113 . . . |
|  | P1-3 | r121, r122, r123 . . . |
| Category II |  |  |
| Road section | D2-1 | R201, R202, R203 . . . |
| having a curve | D2-2 | R211, R212, R213 . . . |
| with a curve | D2-3 | R221, R222, R223 . . . |
| angle between 30 | P2-1 | r201, r202 , r203 . . . |
| and 60 degrees | P2-2 | r211, r212, r213 . . . |
|  | P2-3 | r221, r222, r223 . . . |
| Category III |  |  |
| Road section | D3-1 | R301, R302, R303 . . . |
| having a curve | D3-2 | R311, R312, R313 . . . |
| with a curve | D3-3 | R321, R322, R323 . . . |
| angle greater | P3-1 | r301, r302, r303 . . . |
| than 60 degrees | P3-2 | r311, r312, r313 . . . |
|  | P3-3 | r321, r322, r323 . . . |
| Category IV |  |  |
| Road section | D4-1 | R401, R402, R403 . . . |
| with multiple | D4-2 | R411, R412, R413 . . . |
| curves | D4-3 | R421, R422, R423 . . . |
|  | P4-1 | r401, r402, r403 . . . |
|  | P4-2 | r411, r412, r413 . . . |
|  | P4-3 | r421, r422, r423 . . . |
| Category V |  |  |
| Road section | D5-1 | R501, R502, R503 . . . |
| with an | D5-2 | R511, R512, R513 . . . |
| intersection | D5-3 | R521, R522, R52 3 . . . |

TABLE 1-continued

| | Road Section | Driving Records |
|---|---|---|
| having more than three arms | P5-1 | r501, r502, r503 . . . |
| | P5-2 | r511, r512, r513 . . . |
| | P5-3 | r521, r522, r523 . . . |
| Category VI | | |
| Road section with multiple lanes converging into a reduced number of lanes | D6-1 | R601, R602, R603 . . . |
| | D6-2 | R611, R612, R613 . . . |
| | D6-3 | R621, R622, R623 . . . |
| | P6-1 | r601, r602, r603 . . . |
| | P6-2 | r611, r612, r 613 . . . |
| | P6-3 | r621, r622, r623 . . . |
| Category VII | | |
| Straight road section with a length greater than a predetermined distance | D7-1 | R701, R702, R703 . . . |
| | D7-2 | R711, R712, R713 . . . |
| | D7-3 | R721, R722, R723 . . . |
| | P7-1 | r701, r702, r703 . . . |
| | P7-2 | r711, r712, r713 . . . |
| | P7-3 | r721, r722, r723 . . . |

Figure 6:
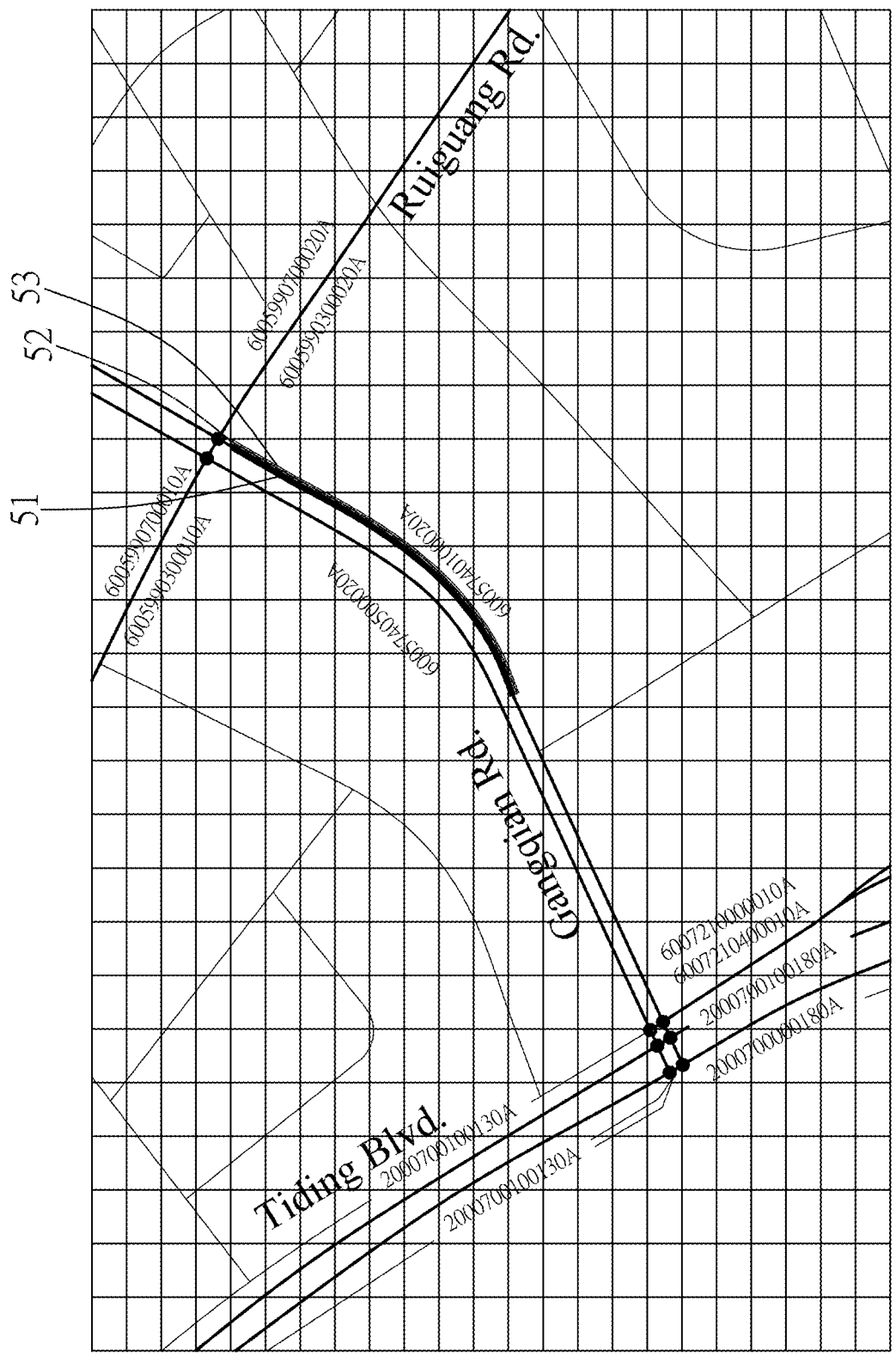
FIG. 6 is an exemplary part of the electronic map, showing three distinct moving tracks of different vehicles overlapping a predetermined dangerous road section.

With each of the in-vehicle systems 4 communicating with the server 2 to supply the vehicle dataset periodically, the server 2 may collect a large amount of data regarding the vehicles 3 travelling in areas within the electronic map, especially through the predetermined dangerous road sections. For example, FIG. 6 illustrates three distinct moving tracks 51, 52 and 53, each indicating a route of one vehicle 3 which have travelled along Gangqian Road when driven on Gangqian Road.

In step S6, for each of the predetermined dangerous road sections (obtained in step S2), the processor 20 calculates a first driving characteristic dataset based on the driving records that are associated with the predetermined dangerous road section. Then, for each of the plurality of section categories, the processor 20 generates a reference dataset based on the first driving characteristic datasets that correspond to those of the predetermined dangerous road sections that belong to the section category. The processor 20 further stores the reference dataset thus calculated in the data storage 25. The operations in this step may be done by an evaluation module 23 of the processor 20. In this embodiment, the evaluation module 23 may be embodied using a software application or a deep learning neural network to perform the operations.

Specifically, a first driving characteristic dataset may be in the form of a string of numbers indicating different characteristic values that represent a representative driving pattern of those vehicles 3 which have travelled along the predetermined dangerous road section when driven on the predetermined dangerous road section, and may be calculated based on main factors (e.g., the velocity, the acceleration and the lateral acceleration) in the driving records of these vehicles 3 when driven on the predetermined dangerous road section. In this embodiment, the first driving characteristic dataset may be in the form of [x, y, z], where x represents a characteristic value related to a number of occurrences of sudden deceleration in the predetermined dangerous road section, y represents a characteristic value related to a number of occurrences of sudden acceleration in the predetermined dangerous road section, and z represents a characteristic value related to a number of occurrences of abrupt turn in the predetermined dangerous road section. The abrupt turn can be determined according to the rotation angle of the steering wheel. In some embodiments, for each of the characteristic values related to the occurrences of sudden deceleration, the occurrences of sudden acceleration or the occurrences of abrupt turn, the characteristic value of the first driving characteristic dataset is an average or a median of the relevant numbers in the driving records of these vehicles 3 when driven on the predetermined dangerous road section.

The reference dataset represents a representative driving pattern of those vehicles 3 that have travelled on those of the predetermined dangerous road sections which belong to the section category when driven on these predetermined dangerous road sections, and may also be in the form of a string of numbers. For each of the section categories, the reference dataset is one of the first driving characteristic datasets that correspond to the section category, or includes an average or a median of the characteristic values related to the number of occurrences of sudden deceleration in the first driving characteristic datasets, an average or a median of the characteristic values related to the number of occurrences of sudden acceleration, and/or an average or a median of the characteristic values related to the number of occurrences of abrupt turn.

In step S7, for each of the identified road sections (obtained in step S3), the processor 20 further calculates a second driving characteristic dataset based on those of the driving records that are associated with the identified road section. The operations in this step may be done by the evaluation module 23 of the processor 20.

Similar to the first driving characteristic dataset, the second driving characteristic dataset may be in the form of a string of numbers indicating different characteristic values that represent a representative driving pattern of those vehicles 3 which have travelled along the identified road section when driven on the identified road section, and may be calculated based on the main factors in the driving records of these vehicles 3 when driven on the identified road section. In this embodiment, the second driving characteristic dataset may be in the form of [x', y', z'], where x' represents a characteristic value related to a number of occurrences of sudden deceleration in the identified road section, y' represents a characteristic value related to a number of occurrences of sudden acceleration in the identified road section, and z' represents a characteristic value related to a number of occurrences of abrupt turn in the identified road section. Similarly, for each of the characteristic values related to the occurrences of sudden deceleration, the occurrences of sudden acceleration or the occurrences of abrupt turn, the characteristic value of the second driving characteristic dataset is an average or a median of the relevant numbers in the driving records of these vehicles 3 when driven on the identified road section.

After the operations of steps S6 and S7, a driving characteristic table containing data associated with the road sections and the associated first and second driving characteristic datasets may be created.

The following Table 2 lists, for each of the section categories, the associated road sections (including the predetermined dangerous road sections (designated by "D1-1", "D1-2", etc.) and the road sections that are not in the predetermined dangerous section list (designated by "P1-1", "P1-2", etc.)), the corresponding first or second driving characteristic datasets (designated by "A1", "A2", etc.), and the associated reference dataset (designated separately for each section category by "A", "B", etc.).

TABLE 2

| | Road Section | First/Second Driving Characteristic Datasets | Reference Dataset |
|---|---|---|---|
| Category I | | | |
| Road section having a curve with a curve angle smaller than 30 degrees | D1-1<br>D1-2<br>D1-3<br>P1-1<br>P1-2<br>P1-3 | A1<br>A2<br>A3<br>a1<br>a2<br>a3 | A |
| Category II | | | |
| Road section having a curve with a curve angle between 30 to 60 degrees | D2-1<br>D2-2<br>D2-3<br>P2-1<br>P2-2<br>P2-3 | B1<br>B2<br>B3<br>b1<br>b2<br>b3 | B |
| Category III | | | |
| Road section having a curve with a curve angle greater than 60 degrees | D3-1<br>D3-2<br>D3-3<br>P3-1<br>P3-2<br>P3-3 | C1<br>C2<br>C3<br>c1<br>c2<br>c3 | C |
| Category IV | | | |
| Road section with multiple curves | D4-1<br>D4-2<br>D4-3<br>P4-1<br>P4-2<br>P4-3 | D1<br>D2<br>D3<br>d1<br>d2<br>d3 | D |
| Category V | | | |
| Road section with an intersection having more than three arms | D5-1<br>D5-2<br>D5-3<br>P5-1<br>P5-2<br>P5-3 | E1<br>E2<br>E3<br>e1<br>e2<br>e3 | E |
| Category VI | | | |
| Road section with multiple lanes converging into a reduced number of lanes | D6-1<br>D6-2<br>D6-3<br>P6-1<br>P6-2<br>P6-3 | F1<br>F2<br>F3<br>f1<br>f2<br>f3 | F |
| Category VII | | | |
| Straight road section with a length greater than a predetermined distance | D7-1<br>D7-2<br>D7-3<br>P7-1<br>P7-2<br>P7-3 | G1<br>G2<br>G3<br>g1<br>g2<br>g3 | G |

In step S8, for each of the identified road sections, the processor 20 determines whether the identified road section should be deemed as a potential dangerous road section by comparing the second driving characteristic dataset that corresponds to the identified road section and the reference dataset that corresponds to one of the section categories, to which the identified road section belongs. The operations in this step may be done by the evaluation module 23 of the processor 20.

In one example, for each of the identified road sections, the evaluation module 23 may first convert each of the corresponding second driving characteristic dataset and the reference dataset into a vector, and compare these two vectors thus converted using, for example, a cosine similarity algorithm to obtain a similarity between these two vectors. In other examples, a Pearson correlation coefficient (PCC) between the second driving characteristic dataset and the reference dataset may be calculated. After the similarity or the PCC is calculated, the evaluation module 23 may compare the similarity or the PCC with a predetermined threshold (e.g., 0.9). When the similarity or the PCC is greater than the predetermined threshold, the identified road section is determined to be a potential dangerous road section.

It is noted that in various embodiments, other manners of determining whether the identified road section should be deemed as a potential dangerous road section may be employed.

In one embodiment, the second driving characteristic dataset may be compared with the reference dataset by comparing each of the components of the second driving characteristic dataset with the corresponding components of the reference dataset. As such, the identified road section may be determined as a potential dangerous road section when a number of components of the second driving characteristic dataset that are greater than the corresponding components of the reference dataset is larger than a number of components of the second driving characteristic dataset that are less than the corresponding components of the reference dataset. In some cases, each of the components may be assigned a specific weight (e.g., an abrupt turn may be a more probable cause for accident than a sudden deceleration, therefore the abrupt turn may be assigned with a larger weight than the sudden deceleration), and the comparison may be done further based on the respective weights. When the number of the components is an even number, the use of weighted calculation may prevent the possibility of a tie.

In one embodiment, one of the components included in the second driving characteristic dataset may be used to be compared with a corresponding component in the reference dataset without calculating the similarity or the PCC, and the corresponding identified road section may be determined as a potential dangerous road section when the component of the second driving characteristic dataset is greater than or equal to the corresponding component of the reference dataset.

In one embodiment, the evaluation module 23 may obtain, from each of the plurality of section categories, a sorted list of the identified road sections. Specifically, for each of the identified road sections belonging to the same section category, a characteristic value may be calculated using one or more components included in the second driving characteristic dataset that corresponds to the identified road section (e.g., a summation of a number of abrupt turns and a number of sudden decelerations). Afterward, the evaluation module 23 may sort the characteristic values of these identified road sections that belong to the same section category to form the sorted list, and determine a subset of the identified road sections with the highest characteristic value (e.g., the highest 20 percent) as the potential dangerous road sections. It is noted that the comparison may be done with respect to some of the components included in the second driving characteristic dataset instead of all of the components. In some cases, each of the components may be assigned a specific weight (e.g., an abrupt turn may be a more probable cause for accident than a sudden deceleration, therefore the abrupt turn may be assigned with a larger weight than the sudden deceleration), and the comparison may be done further based on the respective weights.

In one embodiment, the second driving characteristic dataset may be compared with the reference dataset by first calculating an average or a median of the components of the second driving characteristic dataset, and calculating an average or a median of the corresponding components of the reference dataset. Then, the evaluation module 23 may compare the averages or the medians for determination.

In one embodiment, for different section categories, the comparison may be based on different components of the second driving characteristic dataset and one or more predetermined risk threshold values. For example, for Categories I to III in the example of Table 2, one or more velocities of the vehicle entering the curve(s), and/or one or more velocities of the vehicle 3 leaving the curve(s) may be used for comparison, and the predetermined risk threshold value may include a predetermined safety speed ceiling. For Category VII, a highest velocity or an average velocity of the associated driving records may be used as the predetermined risk threshold value for comparison, and the reference dataset may include a predetermined speed limit. It is noted that the predetermined risk threshold value may be calculated based on the characteristics of the vehicle and parameters of the road section.

When it is determined that an identified road section should be deemed as a potential dangerous road section, the flow proceeds to step S9, in which the processor 20 tags the identified road section on the electronic map as a potential dangerous road section to obtain an updated electronic map. It is noted that the processor 20 further tags each of the predetermined dangerous road sections in the predetermined dangerous section list on the electronic map.

The operations in this step may be done by an update module 24 of the processor 20. In this embodiment, the update module 24 may be embodied using a software application or a deep learning neural network to perform the operations.

Figure 7:
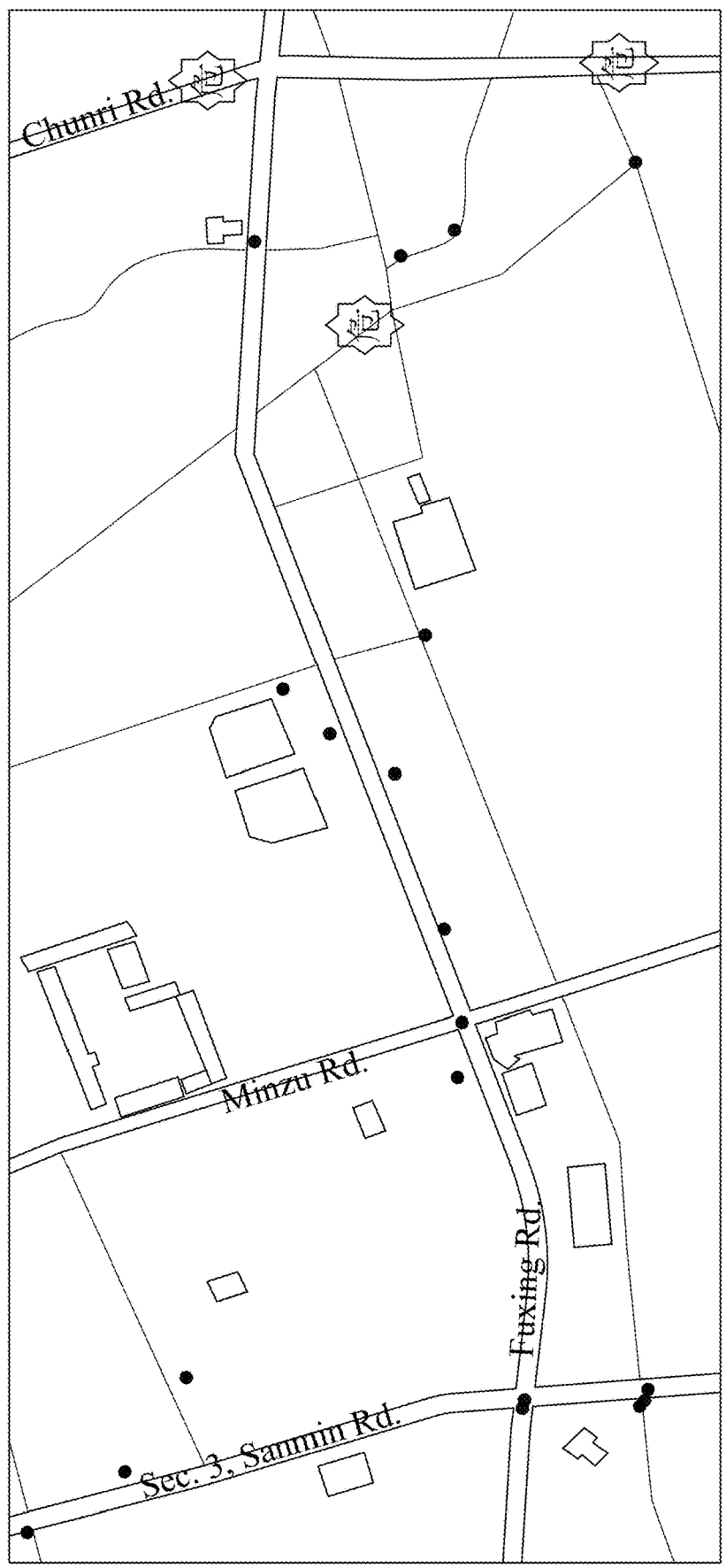
FIG. 7 illustrates an exemplary updated electronic map, in which the predetermined dangerous road sections and potential dangerous road sections may be displayed in different manners.

FIG. 7 illustrates an exemplary updated electronic map, in which the predetermined dangerous road sections in the predetermined dangerous section list are displayed as black dots, and any potential dangerous road section may be displayed in a different manner, such as a symbol "!".

In step S10, the processor 20 stores the updated electronic map in the data storage 25.

In step S11, the processor 20 controls the communication unit 26 to transmit the updated electronic map to the in-vehicle system 4 of each of the vehicles 3, so as to enable the in-vehicle system 4 to generate an alert when the respective vehicle 3 approaches one of the predetermined dangerous road sections and the potential dangerous road sections. It is noted that in some embodiments, the processor 20 controls the communication unit 26 to transmit the updated electronic map to the one or more of client electronic devices 5 for enabling the user to view the updated electronic map thereon.

Specifically, the processor 40 may control the display screen of the interface 45 to display the updated electronic map when the respective vehicle 3 is moving, and may be configured to determine whether the respective vehicle 3 is moving towards one of the predetermined dangerous road sections and the potential dangerous road sections based on the data collected by the GPS component of the positioning subsystem 42. As such, the processor 40 may control the display screen and/or the audio output component to output the alert. In some embodiments, the positioning subsystem 42 may incorporate a navigation function for plotting a route from a starting point to a destination, and when the updated electronic map is used, may plot the route to avoid the predetermined dangerous road sections and the potential dangerous road sections.

Since the communication unit 26 periodically receives the vehicle dataset from each of the vehicles 3 in step S4, steps S5 to S7 should be periodically implemented to newly generate the reference dataset for each of the plurality of section categories and the second driving dataset for each of the identified road sections that have not been deemed as a potential dangerous road section in previous execution of step S8. Then, for each of the identified road sections that has not been deemed as a potential dangerous road section in the previous execution of step S8, step S8 is repeated to determine whether the identified road section should be deemed as a potential dangerous road section based on the reference dataset and the second driving dataset that are newly generated in steps S6 and calculated in S7, respectively.

When any one of the identified road sections that has not been deemed as a potential dangerous road section is determined to be deemed as a potential dangerous road section, steps S9 to S11 are repeated to further update the updated electronic map, store the newly updated electronic map in the data storage 25, and transmit the newly updated electronic map to the in-vehicle system 4 of each of the vehicles 3. In some embodiments, a vehicle 3 may transmit the vehicle-captured video recorded by the video recorder 43 to the server 2.

In response, the processor 20 may be configured to obtain, for one of the predetermined dangerous road sections and the potential dangerous road sections on the updated electronic map, a part of the vehicle-captured video that is associated with said road section from the vehicle-captured video, and to store the part of the vehicle-captured video and the relevant portion of the vehicle dataset in the data storage 25.

In this manner, the server 2 may provide the part of the vehicle-captured video for viewing by the public using, for example, the client electronic device 5. In this manner, the viewers may be prepared prior to driving through a road section he/she is not familiar with and/or a section that is deemed to be dangerous.

Figure 8:
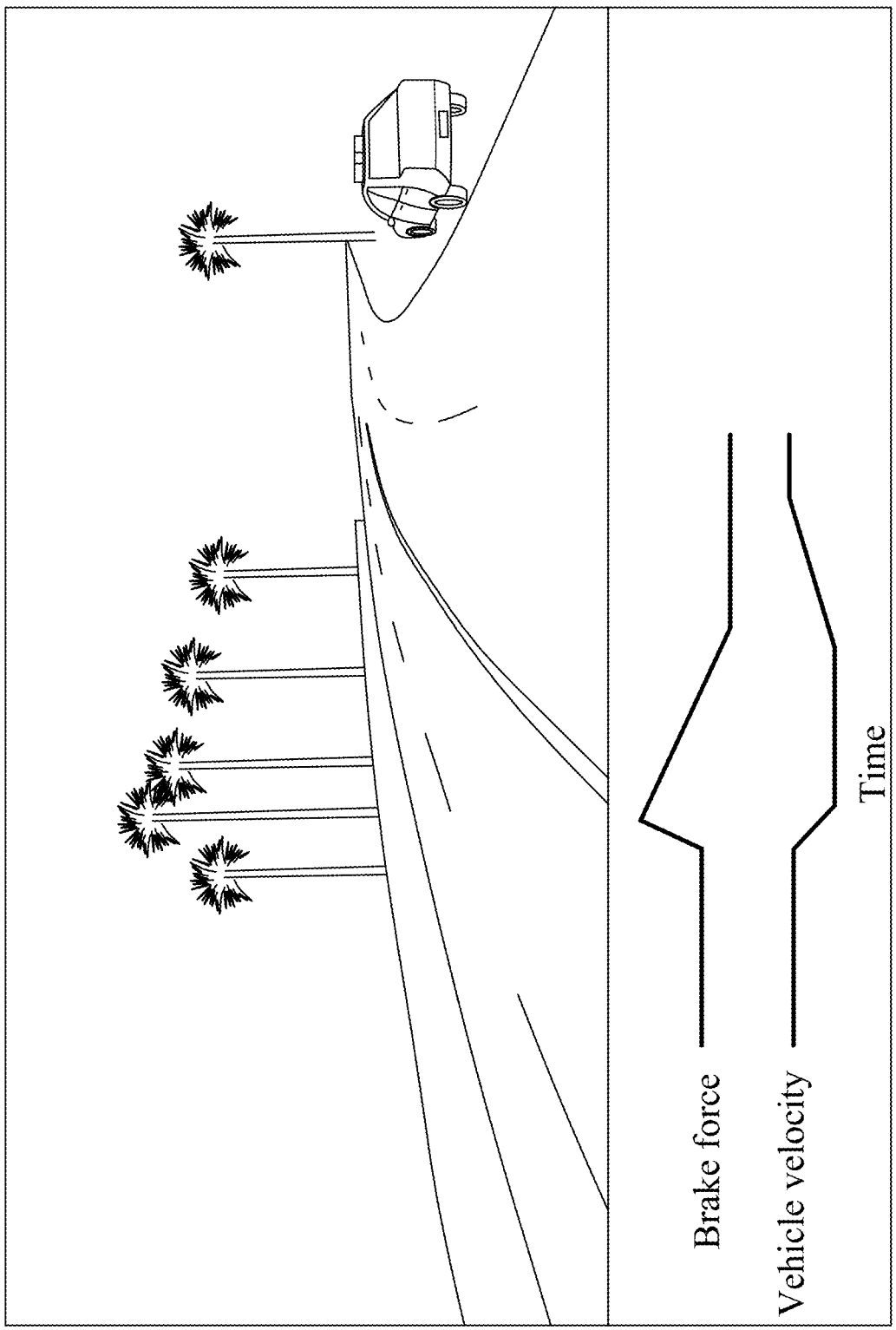
FIG. 8 illustrates an exemplary screenshot of a part of a vehicle-captured video, with one or more components of a corresponding vehicle dataset being displayed.

FIG. 8 illustrates a screenshot of the part of the vehicle-captured video at a specific road section from a specific vehicle 3, with one or more components of the vehicle dataset associated with the same vehicle 3 for the same road section being displayed (e.g., a force applied to the brake pedal, a velocity of the vehicle, etc.). In this manner, a viewer may be informed about the reality of the predetermined dangerous road sections or the potential dangerous road sections.

In one embodiment, the server 2 may transmit the data generated in the method (the vehicle datasets, the first driving characteristic datasets, the second driving characteristic datasets, the updated electronic map, etc.) to the UBI server 6, so as to enable a UBI institution to determine or to adjust an insurance premium of the vehicle insurance dynamically based on the driving characteristic dataset(s).

It is noted that in some embodiments, the term "vehicles" may not be necessarily the same vehicles throughout the method. For example, while the driving records may be extracted from a number of specific vehicles, the travelled road section may be associated with other separate vehicles.

To sum up, the embodiments of the disclosure provide a method and a system for identifying dangerous road sections. By using the published data and vehicle datasets from multiple vehicles, the method and system can identify potential dangerous road sections, and tag the predetermined dangerous road sections and the potential dangerous road sections on the electronic map, and transmit the updated electronic map to the vehicles. In this manner, the users of vehicles may be notified of the predetermined dangerous road sections and the potential dangerous road sections, which may assist in raising awareness of road sections that are potentially hazardous, and potentially reducing the possibility of traffic accidents.

According to one embodiment, there is provided a method for identifying dangerous road sections. The method is implemented using a server that communicates with a plurality of vehicles. The server includes a processor, a communication unit, and a data storage. The data storage stores an electronic map, a plurality of section categories each of which is defined by at least one condition of a road section, and a plurality of reference datasets respectively for the plurality of section categories.

Each of the reference datasets represents a representative driving pattern of vehicles driving on predetermined dangerous road sections that belong to the respective one of the plurality of section categories. The method includes:

by the processor, obtaining an identified road section by scanning the electronic map to identify an unidentified road section that fits the at least one condition associated with one of the plurality of the section categories to serve as the identified road section, and categorizing the identified road section into said one of the plurality of the section categories;

receiving, by the communication unit, a vehicle dataset from each of the vehicles, the vehicle dataset including a moving track of the vehicle and raw data related to a plurality of components of the vehicle;

with respect to the vehicle dataset from each of the vehicles, determining, by the processor, whether the moving track included in the vehicle dataset indicates that a travelled road section, through which the vehicle has travelled, has been categorized into one of the plurality of section categories, and when it is determined that the travelled road section has been categorized into one of the plurality of section categories, by the processor, extracting a driving record associated with the travelled road section from the vehicle dataset and storing the driving record in the data storage, so as to obtain, for each of the road sections belonging to one of the plurality of section categories, a plurality of driving records that are obtained respectively from the vehicle datasets of the vehicles which were driven on the road section;

for each of the identified road sections, calculating, by the processor, an identified-road-section (IRS) driving characteristic dataset based on the driving records that are associated with the identified road section; and for each of the identified road sections, determining, by the processor, whether the identified road section should be deemed as a potential dangerous road section based on at least the IRS driving characteristic dataset and a corresponding one of the plurality of reference datasets that corresponds to one of the section categories, to which the identified road section belongs.

In the above embodiment, the method further includes:

obtaining, by the processor, a predetermined dangerous section list including a plurality of predetermined dangerous road sections;

assigning, by the processor, each of the predetermined dangerous road sections to one of the plurality of section categories stored in the data storage;

for each of the predetermined dangerous road sections, calculating, by the processor, a predetermined driving characteristic dataset based on the driving records that are associated with the predetermined dangerous road section; and for each of the plurality of section categories, generating, by the processor, the reference dataset based on the predetermined driving characteristic datasets that correspond to those of the predetermined dangerous road sections that belong to the section category.

According to one embodiment, there is provided a server that is configured to implement the above-mentioned method.

According to one embodiment, there is provided a non-transitory computer-readable storage medium storing instructions that, when executed by a processor of an electronic device communicating with a plurality of vehicles, cause the processor to perform steps of the method of FIG. 1.

According to one embodiment, there is provided an application-specific integrated circuit (ASIC) that includes circuit blocks that, when integrated with an electronic device communicating with a plurality of vehicles, cause the electronic device to perform steps of the method of FIG. 1.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for identifying accident-prone road sections, the method being implemented using a server that communicates with a plurality of vehicles, the server including a processor, a communication unit, and a data storage that stores an electronic map, a plurality of section categories each of which is defined by at least one condition of a road section, and a plurality of reference datasets that correspond respectively with the plurality of section categories, each of the reference datasets representing a representative driving pattern of vehicles driving on predetermined accident-prone road sections that belong to the respective one of the plurality of section categories, the method comprising steps of:

by the processor, obtaining an identified road section by scanning the electronic map to identify an unidentified road section that fits the at least one condition associated with one of the plurality of the section categories to serve as the identified road section, and categorizing the identified road section into said one of the plurality of the section categories;

receiving, by the communication unit, a vehicle dataset from each of the vehicles, the vehicle dataset including a moving track of the vehicle and raw data related to a plurality of components of the vehicle;

with respect to the vehicle dataset from each of the vehicles, determining, by the processor, whether the moving track included in the vehicle dataset indicates that a travelled road section, through which the vehicle has travelled, has been categorized into one of the plurality of section categories, and when it is determined that the travelled road section has been categorized into one of the plurality of section categories, by the processor, extracting a driving record associated with the travelled road section from the vehicle dataset and storing the driving record in the data storage, so as to obtain, for each of the road sections belonging to one of the plurality of section categories, a plurality of driving records that are obtained respectively from the vehicle datasets of the vehicles which were driven on the road section;

for each of the identified road sections, calculating, by the processor, an identified-road-section (IRS) driving characteristic dataset based on the driving records that are associated with the identified road section; and for each of the identified road sections, determining, by the processor, whether the identified road section should be deemed as a potential accident-prone road section based on at least the IRS driving characteristic dataset and a corresponding one of the plurality of reference datasets that corresponds to one of the section categories, to which the identified road section belongs;

obtaining, by the processor, a predetermined accident-prone section list including a plurality of predetermined accident-prone road sections;

assigning, by the processor, each of the predetermined accident-prone road sections to one of the plurality of section categories stored in the data storage;

for each of the predetermined accident-prone road sections, calculating, by the processor, a predetermined driving characteristic dataset based on the driving records that are associated with the predetermined accident-prone road section; and for each of the plurality of section categories, generating, by the processor, the reference dataset based on the predetermined driving characteristic datasets that correspond to those of the predetermined accident-prone road sections that belong to the section category;

wherein:
the section categories include a road section with one curve;
the determining of whether the identified road section should be deemed as a potential accident-prone road section is based on the IRS driving characteristic dataset and a predetermined risk threshold value;
the IRS driving characteristic dataset includes velocities of the vehicles entering the curve, and velocities of the vehicles leaving the curve; and
the predetermined risk threshold value includes a predetermined safety speed ceiling;

tagging, by the processor, each of the predetermined accident-prone road sections in the predetermined accident-prone section list on the electronic map;

when it is determined that the identified road section should be deemed as a potential accident-prone road section, tagging the identified road section as a potential accident-prone road section on the electronic map, so as to obtain an updated electronic map which displays the predetermined dangerous road sections and potential dangerous road sections;

storing the updated electronic map in the data storage; and transmitting the updated electronic map to an in-vehicle electronic system in each of the vehicles, the in-vehicle electronic system generating an alert and displaying the map and the alert within the map in the vehicles when the vehicles approach one of the predetermined accident-prone road sections and the potential accident-prone road sections.

2. The method of claim 1, wherein the section categories further include one or more of:
a road section with an intersection having more than three arms;
a road section with multiple lanes converging into a reduced number of lanes; and
a straight road section with a length greater than a predetermined distance.

3. The method of claim 1, wherein:
the raw data extracted from the vehicle dataset and included in the driving record includes two or more of a velocity of the vehicle, a rotation angle of a steering wheel; a frequency of movement of the steering wheel, a frequency of a brake pedal being operated, a location of the vehicle when the brake pedal was operated, a force applied to the brake pedal when operated, an acceleration of the vehicle, a lateral acceleration of the vehicle, an inclination angle of the vehicle, an inclination acceleration of the vehicle, and a sudden acceleration or deceleration of the vehicle; and
the calculating of the predetermined driving characteristic dataset and the calculating of the IRS driving characteristic dataset are implemented by the processor based on at least a part of the corresponding driving record.

4. The method of claim 1, further comprising:
receiving, by the communication unit, a vehicle-captured video from one of the vehicles;
obtaining, by the processor, a part of the vehicle-captured video that is associated with one of the predetermined accident-prone road sections and the potential accident-prone road sections from the vehicle-captured video; and
storing the part of the vehicle-captured video in the data storage.

5. A non-transitory computer-readable storage medium storing instructions that, when executed by a processor of an electronic device communicating with a plurality of vehicles, cause the processor to perform steps of the method of claim 1.

6. An application-specific integrated circuit (ASIC) comprising circuit blocks that, when integrated with an electronic device communicating with a plurality of vehicles, cause the electronic device to perform steps of the method of claim 1.

7. A server for identifying accident-prone road sections on an electronic map, said server comprising a processor, a communication unit coupled to said processor for communicating with a plurality of vehicles, and a data storage coupled to said processor and storing an electronic map and a plurality of section categories each of which is defined by at least one condition of a road section, the data storage further storing a plurality of reference datasets respectively for the plurality of section categories, each of the reference datasets representing a representative driving pattern of vehicles driving on predetermined accident-prone road sections that belong to the respective one of the plurality of section categories, wherein said processor is programmed to:

obtain an identified road section by scanning the electronic map to identify an unidentified road section that fits the at least one condition associated with one of the plurality of the section categories to serve as the identified road section, and categorize the identified road section into said one of the plurality of the section categories;

control said communication unit to receive a vehicle dataset from each of the vehicles, the vehicle dataset including a moving track of the vehicle and raw data related to a plurality of components of the vehicle;

with respect to the vehicle dataset from each of the vehicles, determine whether the moving track included in the vehicle dataset indicates that a travelled road section, through which the vehicle has travelled, has been categorized into one of the plurality of section categories, and when it is determined that the travelled road section has been categorized into one of the plurality of section categories, extract a driving record associated with the travelled road section from the vehicle dataset and store the driving record in the data storage, so as to obtain, for each of the road sections belonging to one of the plurality of section categories, a plurality of driving records that are obtained respectively from the vehicle datasets of the vehicles which were driven on the road section;

for each of the identified road sections, calculate an identified-road-section (IRS) driving characteristic dataset based on the driving records that are associated with the identified road section; and for each of the identified road sections, determine whether the identified road section should be deemed as a potential accident-prone road section based on at least the IRS driving characteristic dataset and a corresponding one of the reference datasets that corresponds to one of the section categories, to which the identified road section belongs;

wherein said processor is further programmed to:

obtain a predetermined accident-prone section list including a plurality of predetermined accident-prone road sections;

assign each of the predetermined accident-prone road sections to one of the plurality of section categories stored in said data storage;

for each of the predetermined accident-prone road sections, calculate a predetermined driving characteristic dataset based on the driving records that are associated with the predetermined accident-prone road section; and for each of the plurality of section categories, generate the reference dataset based on the predetermined driving characteristic datasets that correspond to those of the predetermined accident-prone road sections that belong to the section category;

wherein the section categories include a road section with one curve, and said processor is programmed to determine whether the identified road section should be deemed as a potential accident-prone road section based on the IRS driving characteristic dataset and a predetermined risk threshold value;

the IRS driving characteristic dataset includes velocities of the vehicles entering the curve, and velocities of the vehicles leaving the curve; and the predetermined risk threshold value includes a predetermined safety speed ceiling;

the processor is further programmed to tag each of the predetermined accident-prone road sections in the predetermined accident-prone section list on the electronic map;

when it is determined that the identified road section should be deemed as a potential accident-prone road section, the processor is further programmed to tag the identified road section as a potential accident-prone road section on the electronic map, so as to obtain an updated electronic map which displays the predetermined dangerous road sections and potential dangerous road sections and stores the updated electronic map in the data storage; and the processor is further programmed to control the communication unit to transmit the updated electronic map to an in-vehicle electronic system in each of the vehicles the in-vehicle electronic system generating an alert and displaying the map and the alert within the map in the vehicles when the vehicles approach one of the predetermined accident-prone road sections and the potential accident-prone road sections.

8. The server of claim 7, wherein the plurality of section categories stored in said data storage further include two or more of:

a road section with an intersection having more than three arms;

a road section with multiple lanes converging into a reduced number of lanes; and a straight road section with a length greater than a predetermined distance.

9. The server of claim 7, wherein:

the raw data extracted from the vehicle dataset and included in the driving record that is extracted by said processor includes two or more of a velocity of the vehicle, a rotation angle of a steering wheel, a frequency of movement of the steering wheel, a frequency of a brake pedal being operated, a location of the vehicle when the brake pedal was operated, a force applied to the brake pedal when operated, an acceleration of the vehicle, a lateral acceleration of the vehicle, an inclination angle of the vehicle, an inclination acceleration of the vehicle, and a sudden acceleration or deceleration of the vehicle; and said processor is programmed to calculate the predetermined driving characteristic dataset and calculate the IRS driving characteristic dataset based on at least a part of the corresponding driving record.

10. The server of claim 7, wherein said processor is further programmed to:

control said communication unit to receive a vehicle-captured video from one of the vehicles;

obtain a part of the vehicle-captured video that is associated with one of the predetermined accident-prone road sections and the potential accident-prone road sections from the vehicle-captured video; and store the part of the vehicle-captured video in said data storage.

* * * * *